June 17, 1941.   J. S. STULL   2,245,732
STOP MECHANISM
Filed June 12, 1940   2 Sheets-Sheet 2

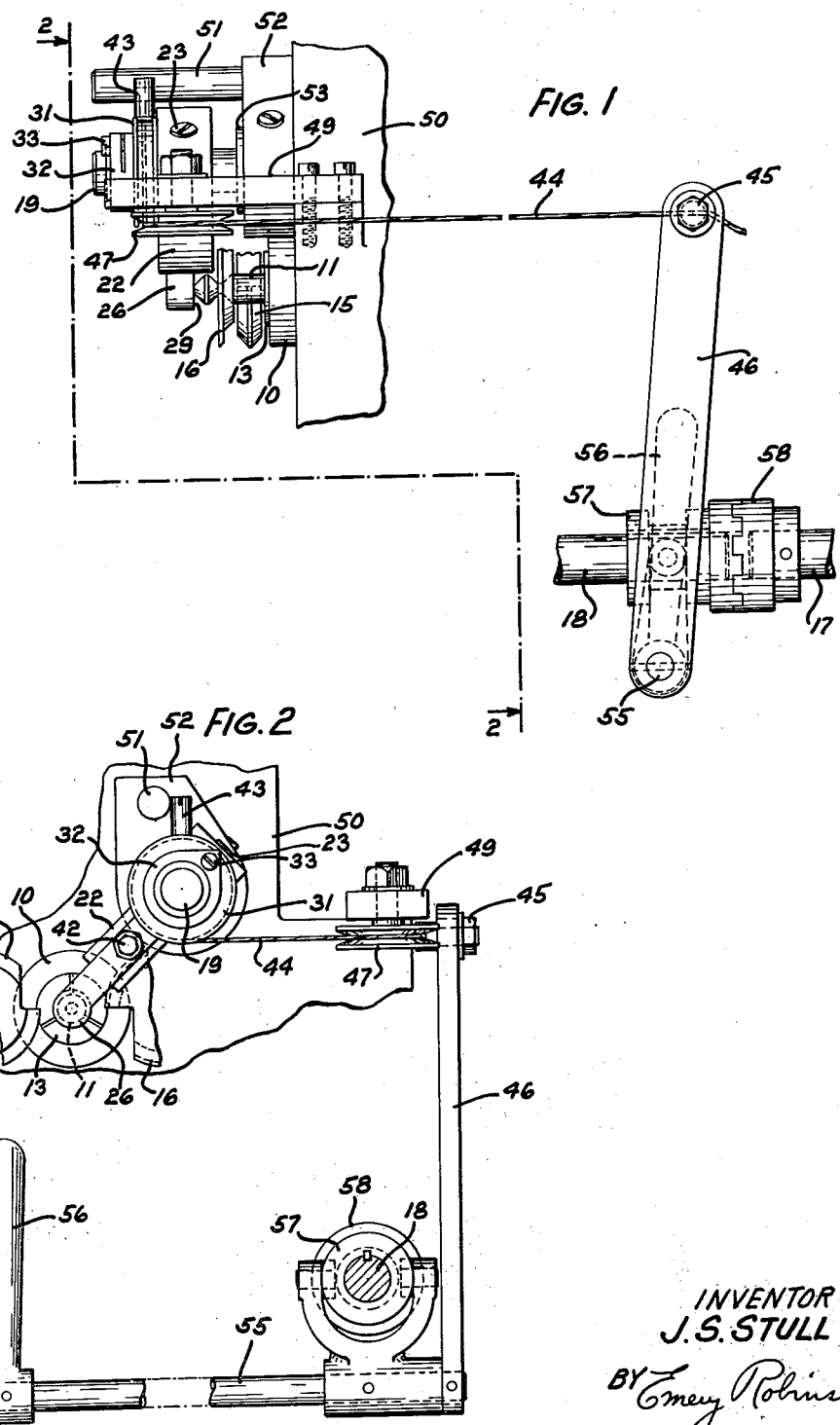

INVENTOR
J. S. STULL
BY Emery Robinson
ATTORNEY

Patented June 17, 1941

2,245,732

UNITED STATES PATENT OFFICE 2,245,732

STOP MECHANISM

John S. Stull, Chicago, Ill., assignor to Western Electric Company, Incorporated, New York, N. Y., a corporation of New York Application June 12, 1940, Serial No. 340,044

7 Claims. (Cl. 192—125)

This invention relates to stop mechanisms and more particularly to automatic stop mechanisms for machine tools in which bar or rod stock is fed forward a required distance during each operating cycle.

The invention is particularly applicable to the usual automatic screw machine employing a stop member for the rod stock as it is fed forward, the stop member being carried on a rock shaft which is oscillated in timed relation with stock feeding means to position the stop member in front of the forward end of the stock as it is fed forward. After the stock feeding movement and before forming and cut-off tools operatively engage the stock, the stop member is rocked to one side. In this type of machine, the feeding means sometimes fails to advance the stock the required distance, which is objectionable since it results in tool breakages or the production of defective piece parts. For instance, if the stock is not advanced a required distance, the cut-off tool will not engaged the previously reduced portion of the stock and in its feed will be broken. Also, this type of machine usually continues to operate idly after the stock has been exhausted and until stopped by the operator.

Objects of this invention are to eliminate the above-referred-to objections by providing, in a machine of the above-described type, a simple and efficient automatic stop mechanism to stop the operation of the machine upon failure of the stock to be fed the required distance or upon exhaustion of the stock.

In accordance with the above objects, the invention contemplates, in one embodiment thereof, as applied to an automatic screw machine, a stop mechanism comprising a spring-pressed stop member pivotally carried on a support fixed to a rock shaft. The stop member at its inner end has a lug arranged to enter a recess in the side face of a sheave, which is freely rotatable upon the support, upon the stop member being oscillated to its operative stop position in line with the stock. Fixed to the sheave is one end of a cable, the opposite end thereof being suitably guided and connected to a clutch tripping lever which controls the operation of the machine from a main drive shaft. Thus, when the required length of stock has not been fed forward or if the stock is exhausted, the locking lug on the spring-pressed stop member will remain in the locking recess and lock the sheave to the stop member. Thereafter, when the rock shaft is oscillated to move the stop member to its inoperative stop position, the sheave is rotated and, by means of the attached cable, the clutch tripping lever is actuated to immediately stop the machine. When the stock has been fed the required distance, it abuts the stop member and rocks it about its pivot against the action of the spring and withdraws the lug from the locking recess, and upon the stop member being oscillated to its inoperative stop position, the sheave is not rotated to actuate the clutch tripping lever.

Other objects and advantages of the invention will more fully appear from the following detailed description, taken in connection with the accompanying drawings, in which Fig. 1 is a diagrammatic side view of an automobile screw machine embodying the automatic stop mechanism of the invention, the stock stop member being shown in its operative stop position;

Fig. 2 is a view taken on the line 2—2 of Fig. 1;

Figure 3:
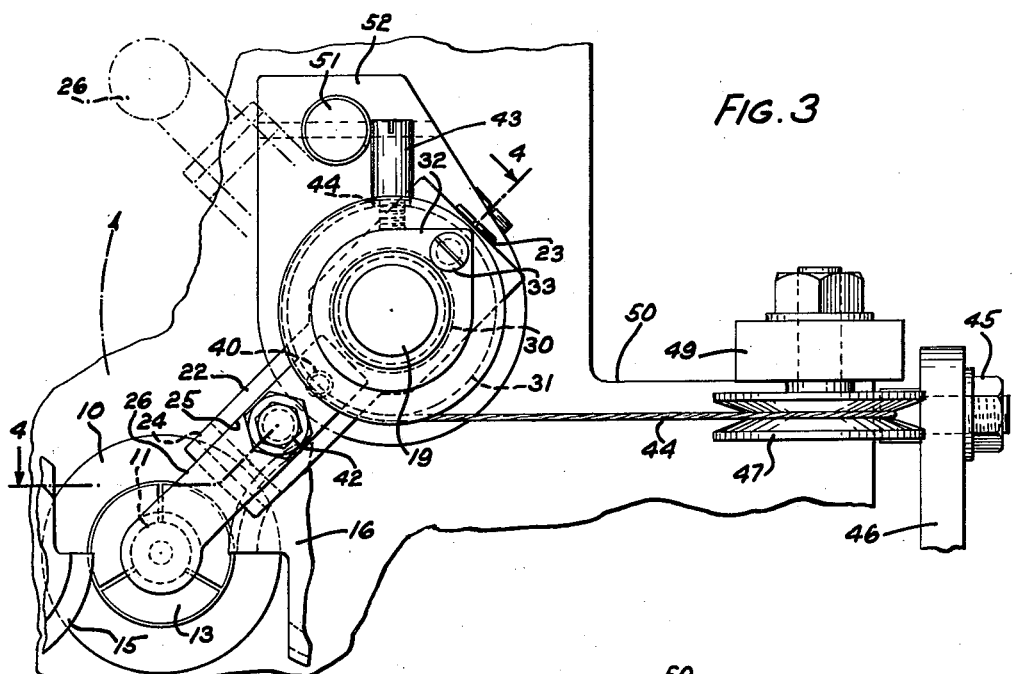
Fig. 3 is an enlarged fragmentary view of Fig. 2.
Figure 4:
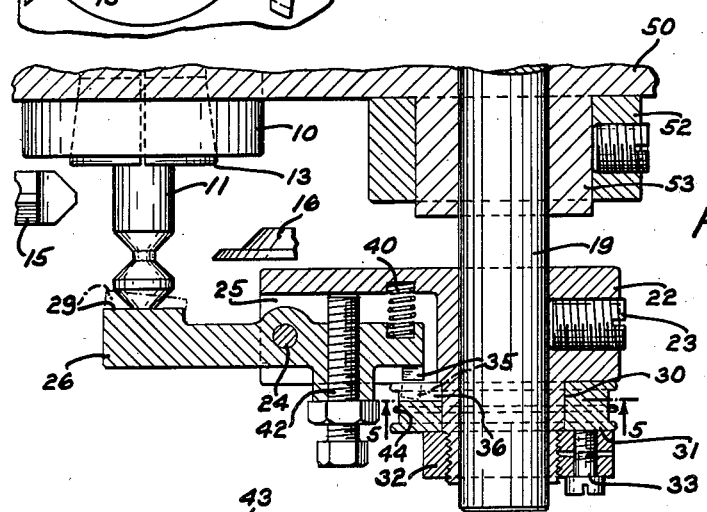
Fig. 4 is an irregular sectional view taken on the line 4—4 of Fig. 3.

Referring to the drawings, one embodiment of the invention is shown applied to an automatic screw machine, shown fragmentarily, of a type employing a single fixed position constantly rotating spindle 10 (Fig. 4). Carried within the spindle 10, and rotated thereby, is a bar or rod of stock 11 from which piece parts are produced, the stock being intermittently fed forward in a usual manner by a feed sleeve (not shown). The stock 11 is periodically secured to and released from the spindle 10 by a chuck 13, which rotates with the spindle and is actuated in a usual manner by a longitudinal movement of a sleeve (not shown). The rotating stock is worked by forming and cut-off tools 15 and 16, respectively, shown fragmentarily (Figs. 2, 3 and 4), movable transversely from opposite sides of the axis of rotation of the stock into operative cutting engagement therewith, the stock during the cutting operation extending from the chuck a predetermined distance. Suitable means, which includes driving and driven shafts 17 and 18, respectively, (Fig. 1), usual in this type of machine, constantly rotates the spindle 10 and other mechanism of the machine when it is in operation. Also, the stock 11 is periodically advanced or fed forward longitudinally of the spindle 10 and chuck 13 by the feed sleeve after being released from the chuck and the latter is caused to alternately release the stock for the feeding movement and thereafter secure it for rotation to the spindle by the movement of its actuating sleeve and the tools 15 and 16 are advanced into operative cutting relation with the peripheral surface of the forward end of the stock, all in timed relation, and by suitable means usual in this type of machine and not shown in the drawings, since they form no part of this invention and are not believed necessary to a complete understanding thereof.

The above described type of machine also includes a rock shaft 19 (Figs. 3 and 4) which carries a stop member for the rod stock, the shaft being oscillated in timed relation with the feeding movement of the stock to position the stop member in the path of the advancing stock so that the correct length of stock will project from the chuck 13 with its forward end abutting the stop member. The length of travel of the stock feed sleeve (not shown) is such that it slides on the stock 11 a small distance, after the end of the stock abuts the stop member, before reaching the end of its forward travel, to ensure a full length feed of the stock. During the securing of the advanced stock to the spindle 10 by the chuck 13 and the advance of the tools 15 and 16 into operative cutting relation with the stock end, the shaft is oscillated to return the stop member to its inoperative position at one side of the stock. This last mentioned position of the stop member is indicated fragmentarily in broken outline in Fig. 3.

Figures 5, 6:
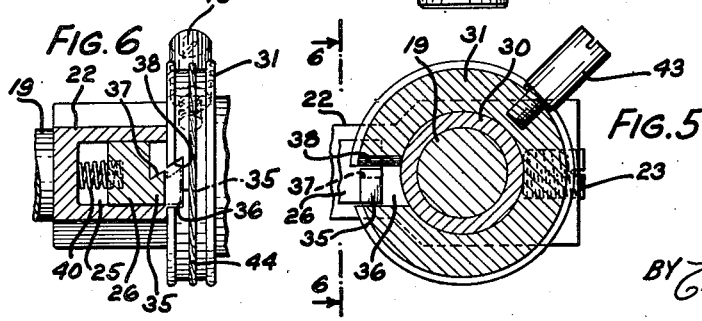
Fig. 5 is a detail sectional view taken on the line 5—5 of Fig. 4.
Fig. 6 is a view taken on the line 6—6 of Fig. 5.

The stop mechanism of this invention comprises a support member 22 suitably positioned along the rock shaft 19 and secured thereto by a screw 23. Pivoted, as indicated at 24 (Fig. 4), in a recess 25 of the member 22 is a stop member 26, the outer end of which is provided with a surface 29 which is engaged by the forward end face of the rod stock 11 in the advance of the stock to the position where it is worked by the tools 15 and 16. Formed on the support member 22 is a shouldered cylindrical extension 30, upon the larger diameter of which is freely rotatably mounted a sheave 31, the sheave being retained in position against a shoulder of the extension by a nut 32 threaded onto an outer reduced and threaded diameter thereof and secured by a binding or set screw 33. The inner end of the stop member 26 extends within the periphery of the sheave 31 and is provided with a lug 35, which, in the operation of the machine, freely rides upon the side face of the sheave, the sheave side face having a recess 36 which is aligned with and adapted to receive the lug each time the stop member reaches its stop position in the operation of the screw machine, which will be described hereinafter. The lug 35 and the recess 36 are formed with inclined faces 37 and 38, respectively, which cooperate to draw the lug fully into the recess during the movement of the stop member 26 to its inoperative stop position in case the lug has not been fully withdrawn from the recess by the stock 11 at the end of its forward feed movement. A coiled compression spring 40 at one end bears against the support member 22 and at its opposite end against the inner end of the stop member 26. The action of the spring 40 is such that the stop member 26 is constantly urged clockwise (Fig. 4) about its pivot 24 to engage the lug 35 of the stop member with the recessed side face of the sheave 31 to cause it to enter the recess 36 when aligned therewith, as shown in dotted outline in Figs. 4 and 6, the action of the spring being overcome when the forward end of the rod stock 11 has been advanced the required distance against the surface 29 of the stop member and rocked the latter counterclockwise to position the lug in the plane of the side face of the sheave, or preferably very slightly spaced therefrom, as indicated in Figs. 4 and 6.

Carried by the stop member 26 between its pivot 24 and the surface 29 thereof is an adjustable stop screw 42, which bears against a surface of the support member 22 when the forward end of the rod stock has been advanced the required distance. By varying the position of the support member 22 longitudinally on the rock shaft 19 and adjusting the stop screw 42, the length of stock 11 advanced during the feeding movement may be varied and accurately determined if within the limits of the feeding mechanism. Threaded into the peripheral surface of the sheave 31 is a screw 43, to which one end of a cable 44 is attached, the opposite end of the cable being connected at 45 to a clutch tripping lever 46. To support and guide the cable 44 between the sheave 31 and the lever 46, it is passed over a pulley 47, carried by a bracket 49 fixed to the machine frame, indicated at 50. The sheave 31, which is freely rotatable upon the support member 22, is normally positioned so that the recess 36 is aligned with and will receive the lug 35 on the stop member 26 when the stop member is oscillated to carry the surface 29 thereof into alignment with the forward end face of the advancing stock 11, as shown in Figs. 3 and 4.

In order to insure this position of the sheave 31, a stationary stop pin 51 is engaged by the head of the set or stop screw 43 carried by the sheave, the cable 44 attached to the sheave and passing around the left side thereof (Fig. 1) normally tending, by its tautness and pull, to rotate the sheave to engage the head of the set screw 43 with and hold it against the stop pin 51. The stop pin 51 is fixed to a support 52, which surrounds and is secured to an extending journal 53 formed on the machine frame for the rock shaft 19.

Referring to Fig. 2, the tripping lever 46 is bifurcated at its lower end and below its furcations is secured to one end of a suitably mounted rock shaft 55, the opposite end of the shaft carrying a hand lever 56 for manually rocking the shaft. The furcations of the lever 46 are pivotally connected to a jaw clutch member 57 splined to the driven shaft 18. Secured to the driving shaft 17 is a jaw clutch member 58 (Fig. 1). When the clutch members 57 and 58 are engaged, as shown, the driving shaft 17, which is constantly rotating after the machine has been set in operation, transmits motion to the driven shaft 18 for actuating the various operating elements of the machine through their periodic movements and upon the tripping lever 46 being rocked counterclockwise about the axis of the shaft 56, the clutch member 57 will be moved longitudinally on the shaft 18 to disengage it from the clutch member 58 and the drive to the various operating elements of the machine will be broken.

The drawings disclose on embodiment of the automatic stop mechanism of this invention as applied to an automatic screw machine of the usual type and only such parts thereof have been shown, more or less diagrammatically and referred to in the above description, which are believed necessary to a clear understanding of the stop mechanism.

It will be assumed, for the purpose of this general description of operation of the stop mechanism, that the main drive shaft 17 is in motion, and, as shown, the clutch members 57 and 58 are engaged. Further, that the rod stock 11 has just been fed forward the required distance and is abutting the surface 29 of the stop member 26, which member is about to be returned to its inoperative position. During the return of the stop member 26, the tools 15 and 16, shown retracted, are advanced to operate upon the rotating rod stock 11. Also, the rod stock 11 has been secured or gripped to the rotating spindle 10 by the chuck 13.

It will be observed, referring to Figs. 4 and 6, that the locking lug 35 of the stop member 26 is shown withdrawn from the locking recess 36 of the sheave 31. This was effected when the feed sleeve (not shown) advanced the rod stock 11 the required distance, during which movement the end face of the stock engaged the surface 29 of the stop member 26 and rocked it counterclockwise about its pivot 24 (Fig. 4) and withdrew the lug 35 from the recess 36 of the sheave 31, the extent of counterclockwise movement of the stop member being limited by the stop screw 42 engaging the surface of the support member 22. This movement of the stop member 26 was resisted by the action of the spring 40 normally urging the stop member clockwise (Fig. 4) to carry the lug 35 into the recess 36. Thus, when the rock shaft 19 is oscillated to move the stop member 26 back to its inoperative stop position, the lug 35 will ride upon the side face of the sheave.

At this point in the cycle of operation of the screw machine, the rock shaft 19, with the support member 22, is oscillated to its inoperative stop position, indicated in dotted outline in Fig. 3, during which movement the stop member lug 35 rides on the side face of the sheave 31, the sheave remaining stationary. Simultaneously with this movement of the stop member 26, the tools 15 and 16 are advanced and form the end portion of the rod stock 11 and sever the worked portion therefrom. Thereafter, in timed relation, the chuck 13 releases the stock 11, the stock is advanced, and the rock shaft 19 is actuated to move the stop member 26 into the path of the advancing stock and the chuck again grips the stock. As the stop member 26 reaches its operative stop position, which is in advance of the engagement of the stock therewith, the stop member lug 35 springs into the recess 36 of the sheave 31, as shown in dotted outline in Figs. 4 and 6. It will be assumed, for one reason or another, that the stock 11 is not advanced the required distance or that the stock is exhausted or is not of sufficient length to be advanced the required distance. As a result, the end of the stock either may engage the surface 29 of the stop member and not rock the stop member sufficiently to withdraw the locking lug 35 completely from the locking recess 36 of the sheave 31 or the stock end may not engage the stop member surface 29. In either case, the lug 35 will not be withdrawn from the recess 36. Consequently, when the stop member 26, locked to the sheave 31, is rocked to its inoperative stop position, it effects a rotation of the sheave and, by means of the cable 44, attached thereto, rocks the clutch tripping lever 46 and therewith the hand lever 56 counterclockwise (Fig. 1) about their pivot. This movement of the lever 46 slides the clutch member 57 longitudinally upon the driven shaft 18, thus disengaging it from the clutch member 58 secured to the constantly rotating drive shaft 17 and the drive to the various operating elements of the machine is broken.

To reset the stop mechanism after the clutch members 57 and 58 have been automatically disengaged in the manner above described, the operator grasps the outer end of the stop member 26 and rocks it counterclockwise about its pivot 24 (Fig. 4) to withdraw the lug 35 thereof from the sheave recess 36, and while withholding the lug from the recess, slightly rotates the sheave in a counterclockwise direction, as viewed in Fig. 3, to slightly displace the recess thereof from the lug and, upon releasing the stop member, the lug will bear against the side face of the sheave. Thereafter, by rocking the hand lever 56 in a clockwise direction, as viewed in Fig. 1, and with it the clutch tripping lever 46 from the position to which they were rocked in a counterclockwise direction when the stop mechanism was actuated to disengage the clutch members 57 and 58, the clutch member 57 is moved into operative engagement with the clutch member 58 on the rotating drive shaft 17, whereupon the machine is set in motion and the production of piece parts continues until failure of the stock 11 to be advanced the required distance or upon exhaustion of the stock. This clockwise movement of the lever 46 through the interconnecting cable 44 effects a counterclockwise rotation of the sheave 31 (Figs. 2 and 3) until the stop screw 43 engages the stop pin 51, in which position the locking recess 36 of the sheave is in its normal position for the entrance of the stop member lug 35.

It will be understood that means other than the sheave 31, cable 44 and pulley 47 may be used for actuating the clutch tripping lever 46. For example, a gear provided with a locking recess is its side face for cooperation with the locking lug on the stop member could be substituted, the gear meshing with a gear rack operatively connected to the clutch tripping lever by means of a suitable lever and link mechanism.

Although the above described stop mechanism of this invention has been disclosed and described in one example of its applicability to an automatice screw machine employing a single fixed position spindle, it will be obvious that it may be applied with the same valuable results to an automatic screw machine of the multiple spindle type wherein the spindles are carried on a rotatable head.

While the invention has been disclosed and described with reference to a particular embodiment thereof and applied to a particular type of machine tool, it will be understood that it may be embodied in various forms and is capable of other applications limited only by the scope of the appended claims.

What is claimed is:

1. A stop mechanism for a machine in which material is intermittently advanced comprising means for controlling the operation of the machine, a material stop member adapted to be predeterminedly normally moved by the material when advanced a required distance, means for bodily moving said member into and out of stop position, and means cooperating with and responsive to an abnormal movement of said member caused by failure of the material to advance the required distance or if the material is exhausted and upon said member moving from its stop position to actuate said controlling means to stop the machine.

2. A stop mechanism for a machine in which material is intermittently advanced comprising means for controlling the operation of the machine, a pivotal material stop member arranged to be engaged by and predeterminedly normally rocked by the material when the latter is advanced a required distance, means for bodily moving said member into and out of stop position, and means cooperating with and responsive to an abnormal pivotal movement of said member caused by failure of the material to advance the required distance or if the material is exhausted and upon said member moving from its stop position to actuate said controlling means to stop the machine.

3. A stop mechanism for a machine in which material is intermittently advanced comprising means for controlling the operation of the machine, a material stop member adapted to be predeterminedly normally moved by the material when advanced a required distance, means for bodily moving said member into and out of stop position, an element adapted to be automatically locked to said member upon the latter reaching its stop position and to be unlocked therefrom when the material is advanced the required distance, and a connection between said element and controlling means, said element remaining locked to said member by failure of the material to advance the required distance or if the material is exhausted and upon said member moving from its stop position to actuate said controlling means to stop the machine.

4. A stop mechanism for a machine in which material is intermittently advanced comprising means for controlling the operation of the machine, a material stop member adapted to be predeterminedly normally moved when in its stop position by the material when advanced a required distance, means for bodily oscillating said member into and out of stop position, and a connection between said member and controlling means including an element engaged by said member adapted to be automatically locked thereto upon reaching its stop position and to be unlocked therefrom when the material is advanced the required distance, said element remaining locked to said member by failure of the material to advance the required distance or if the material is exhausted and upon said member moving from its stop position to actuate said controlling means to stop the machine.

5. A stop mechanism for a machine in which material is intermittently advanced comprising means for controlling the operation of the machine, a material stop member, means for moving said member into and out of stop position, movable means cooperating with said member and adapted to be automatically locked thereto upon the latter being moved to stop position, said member adapted to be independently moved by the material to unlock it from said means upon the material being advanced a required distance, and a connection between said movable and controlling means, said movable means remaining locked to said stop member upon failure of the material to advance the required distance or if the material is exhausted and upon said member moving from its stop position to move therewith and through said connection to actuate said controlling means to stop the machine.

6. A stop mechanism for a machine in which material is intermittently advanced comprising means for controlling the operation of the machine, a material stop member, an oscillatable support upon which said member is pivotally carried, means for bodily oscillating said support to carry said member into and out of stop position, a rotary member cooperating with said member having a normal position and adapted to be automatically locked thereto upon the latter reaching its stop position, said stop member movable about its pivot by the material to unlock it from said means upon the material being advanced a required distance, and a connection between said rotary member and controlling means, said rotary member remaining locked to said stop member upon failure of the material to advance the required distance or if the material is exhausted and upon the stop member moving from its stop position to rotate therewith and through said connection to actuate said controlling means to stop the machine.

7. A stop mechanism for a machine in which material is intermittently advanced comprising means including a clutch device for controlling the operation of the machine, an oscillatable member, a stop member mounted thereon for movement into and out of the path of the material, said stop member being mounted for independent movement on said oscillatable member for a predetermined normal movement effected by the material when advanced a required distance, and means connected to said clutch device automatically connected to said stop member upon movement of said stop member to stop position, said latter means upon an abnormal movement of said stop member caused by failure of the material to advance the required distance or if the material is exhausted to remain connected to said stop member and upon the stop member moving from its stop position to actuate said clutch device to stop the machine.

JOHN S. STULL.